United States Patent
Ustin

Patent Number: 5,602,364
Date of Patent: Feb. 11, 1997

[54] PANEL CHANNEL

[75] Inventor: George Ustin, Croton-on-Hudson, N.Y.

[73] Assignee: Buchanan Construction Products, Inc., Hackettstown, N.J.

[21] Appl. No.: 224,709

[22] Filed: Apr. 8, 1994

[51] Int. Cl.⁶ ........................................ H02G 3/04
[52] U.S. Cl. ............... 174/68.3; 174/101; 138/157; 138/159; 220/6
[58] Field of Search ............... 52/287; 220/6; 248/49; 138/162, 157, 159; 174/101, 68.1, 95, 97, 68.3, 48

[56] References Cited

U.S. PATENT DOCUMENTS

| | | | |
|---|---|---|---|
| 3,156,765 | 11/1964 | Weiss | 174/101 |
| 3,727,644 | 4/1973 | Kagan | 138/155 |
| 3,821,688 | 6/1974 | Larsile | 339/22 R |
| 3,927,698 | 12/1975 | Johannsen | 138/162 |
| 4,391,426 | 7/1983 | Gothberg | 248/49 |
| 4,627,469 | 12/1986 | Buard | 138/92 |
| 4,953,735 | 9/1990 | Tisbo et al. | 220/6 |
| 4,990,722 | 2/1991 | Navazo | 174/97 |
| 5,004,192 | 4/1991 | Handler | 248/49 |
| 5,013,873 | 5/1991 | Deibele et al. | 174/101 |
| 5,243,800 | 9/1993 | Olbrich | 52/287 |
| 5,359,143 | 10/1994 | Simon | 174/101 |

FOREIGN PATENT DOCUMENTS 89-12340  12/1989  WIPO ........................... 174/48

Primary Examiner—Hyung S. Sough
Attorney, Agent, or Firm—Dorn, McEachran, Jambor & Keating

[57] ABSTRACT

A cable duct has a plurality of end-to-end connectable sections, with each section being formed of two interengaging panel members. In combination, the panel members form the side walls, cover and base of each section. Each panel member includes a side wall, cover portion and base portion which are hinged together and when the panels are folded at the hinges, each panel member forms a side wall and a portion of the cover and a portion of the base. The cover portion and base portions overlap with the extent of overlapping determining the space between the side walls and the width of a section. The panel members are adjustably secured together along the base so as to provide connectable sections and thus a cable duct of varying width.

5 Claims, 2 Drawing Sheets

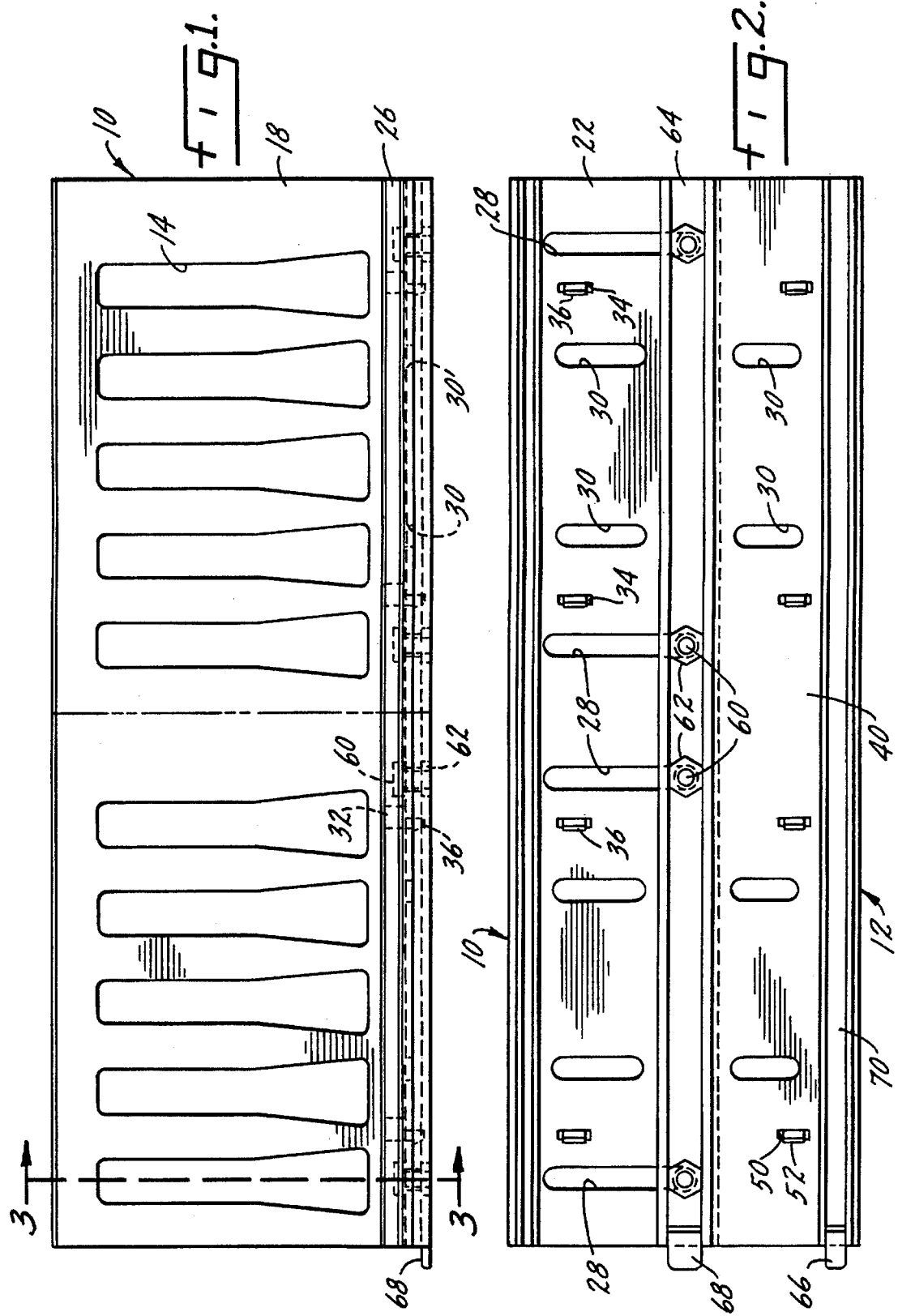

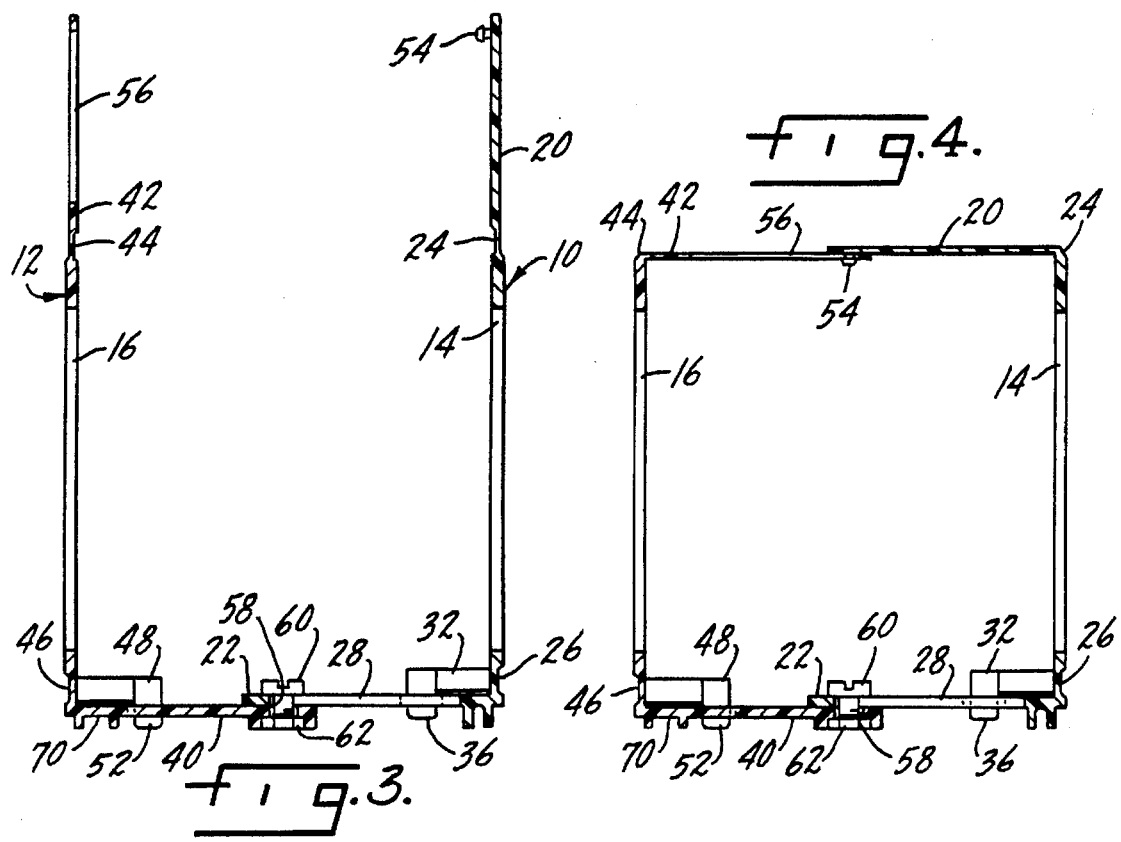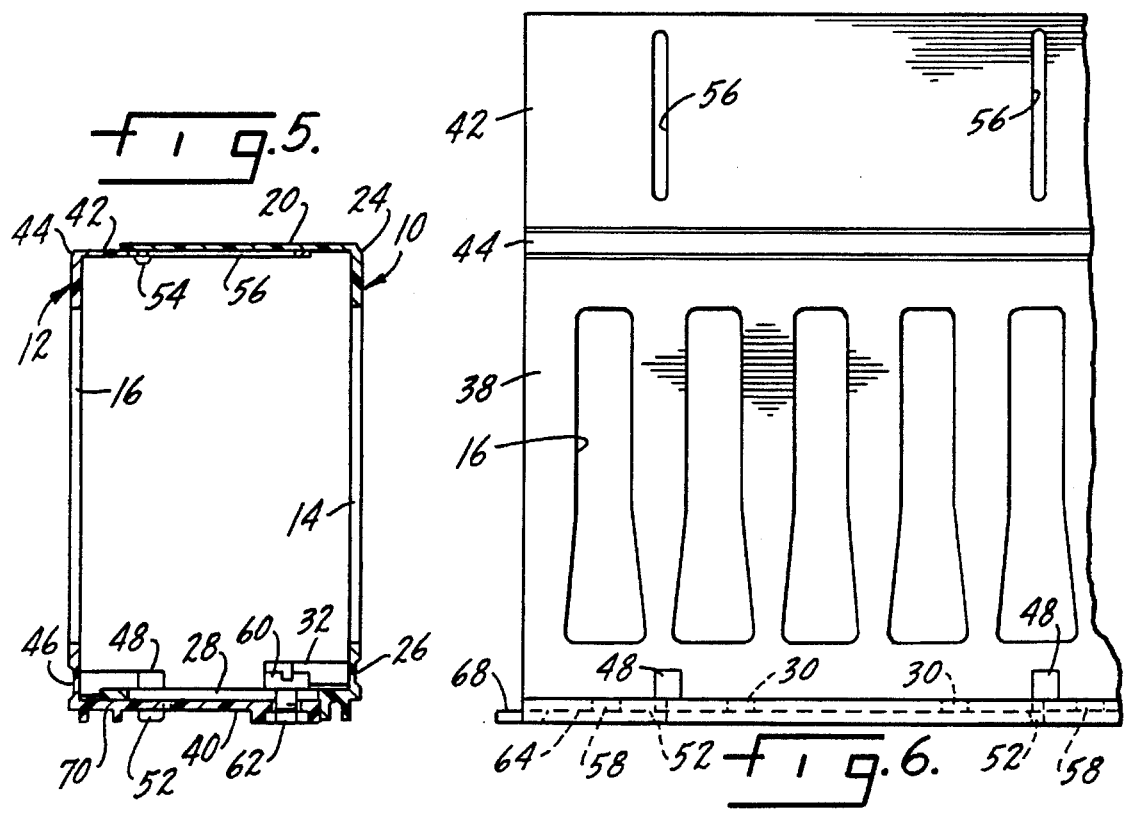

5,602,364

PANEL CHANNEL

THE FIELD OF THE INVENTION

The present invention relates to cable ducts of the type generally formed of thermoplastic material which may be cut to length and normally has solid or slotted sides of various configurations. The cable duct sections may be bent on one or more fold lines to form the three sides of the duct and there is conventionally a separate cover which is attached after the sections have been folded to shape. Such cable ducts may be provided in widths ranging from ½" to 4" and with heights of similar dimensions. The present invention provides a cable duct formed of two panel members each of which are folded to form a side wall and portions of the base and cover. The sections may be in predetermined lengths, for example 1', and there are provisions for connecting adjoining sections to form a cable duct of any desired length. Each panel member includes a latch to hold it in a folded position and includes means for connecting the panel members into a cable duct configuration in such a manner that the width is variable as determined by need. One of the panel members has spaced transverse slots with the other having a fastener hole with the result that the panel members may be connected together to form a duct of variable width by the use of a series of threaded fasteners.

SUMMARY OF THE INVENTION

The present invention relates to cable ducts of the type used to form a channel for one or more wires or cables. A primary purpose of the invention is to provide a reliable, simply constructed cable duct which is easily adjustable as to size.

Another purpose of the invention is to provide a cable duct formed out of two thermoplastic sections, which may be adjustably connected together to form ducts of varying width.

Another purpose is to provide a cable duct as described which is formed of sections of defined length, with each section having means for interconnecting with the adjacent section.

Another purpose of the invention is to provide a simply constructed, inexpensive cable duct formed of a plurality of similar panel members, with the panel members being joined together to form a cable duct section and with the sections being interconnectable one to another.

Other purposes will appear in the ensuing specification, drawings and claims.

BRIEF DESCRIPTION OF THE DRAWINGS

The invention is illustrated diagrammatically in the following drawings wherein:

FIG. 1 is a right side view of the cable duct of the present invention;

FIG. 2 is a bottom view of the cable duct;

FIG. 3 is a section along plane 3—3 of FIG. 1 with the covers open;

FIG. 4 is a section similar to FIG. 3 with the covers closed;

FIG. 5 is a section similar to FIG. 4 showing the cable duct at a narrow width; and FIG. 6 is a partial side view of the left panel of the cable duct.

DESCRIPTION OF THE PREFERRED EMBODIMENT

The cable duct of the present invention is formed in connectable sections, with each section being formed of two interengaging panel members. There is a right-hand member indicated at 10 and a left-hand member indicated at 12. Each of the members has a series of uniformly spaced wire slots 14 and which are used to pass wires into the cable duct and to provide a space for wires to leave the cable duct.

The right-hand panel member 10 includes a side wall 18, a cover portion 20 and a base portion 22. The side wall 18 is joined to the cover and base portions by living hinges indicated at 24 and 26, respectively. The panel members are conventionally formed of a thermoplastic material such as Noryl or the equivalent, with each of the living hinges being formed by a thinner section of the integral panel member. Living hinges are common in the plastic molding art and provide a means for having an integral structure which may be folded along predetermined lines or zones.

The right-hand section has a plurality of transverse slots 28 formed in the base portion 22, which slots are used for adjustably joining the right- and left-hand panel members to form cable duct sections of varying width. The right-hand panel member 10 also has a plurality of duct mounting slots 30, as does the left-hand panel member 12, which slots are for the purpose of mounting the duct sections to a control panel. In order to hold the folded base portion 22 at a right angle to the wall 18, there are a plurality of spaced locking elements in the form of a latch member 32 integrally formed into the side wall 18, which latch members are in alignment with locking latch slots 34 formed in the base portion 22. Each of the latch members 32 has a tapered enlarged projection 36 at the outer end which will pass through the aligned slots 34 to thus hold the walls in the right angle disposition illustrated herein.

The left-hand panel members 12 each have a side wall 38, a base portion 40 and a cover portion 42. Living hinges 44 and 46 formed in the same manner as described in connection with the right-hand panel member join the cover and base portions to the side wall 38. Again, there are a plurality of longitudinally spaced locking elements to hold the base portion in the right angle configuration desired relative to the side wall 38. These locking elements include a latching member 48 in alignment with a locking latch slot 50, the latching member again having a tapered enlarged head 52.

In order to hold the cover portions 20 and 42 in a closed position after they have been folded at their living hinges, there are integrally formed projections 54 on right-hand panel cover portion 20 and mating locking slots 56 on the left-hand cover portion 42. There may be a series of such projections at a uniformly spaced distance along each of the panel members, not only to provide the insurance of several locking elements in each section, but also to provide for the sections being cut into less than complete lengths, but still have all the necessary requirements to form an integral section.

The left-hand panel member 12, in its base portion 40, has a series of holes 58 which are in alignment with the transverse slots 28 when the panel members are assembled into a section as illustrated in the drawings. In order to fasten the panel members into a complete section, fastening members 60 and nuts 62 are used to complete the connection. Each fastening member 60 will pass through an opening 58 and be threaded into a nut 62. The bottom side of each left-hand panel base member 40 has a longitudinally extending groove 64 with a width which is equal to the distance between the flats of the nut 62. Thus, the nut will not turn as the fastening member 60 is rotated to complete the connection. The transverse slots permit variable spacing between the side walls 18 and 38 and thus a variable width to the connectable cable duct sections.

One end of each of the left-hand panel member base portion 40 has longitudinally-extending locating members or projections 66 and 68, which projections will fit within the groove 64 described above and a somewhat smaller groove 70 formed near the edge of the base portion 40 of panel member 12. The projections will telescope into the grooves in the adjoining section so the sections may be connected end to end to form a duct of a desired length. Each of the panel members may be used to form a duct section of equal length, for example 1', and the panel members may also be cut off to form less than full length duct sections. Even a cut-off section has the provision for joining with an adjoining section by means of the projections 66 and 68 and the grooves 64 and 70. It is for this reason that each section carries a plurality of width adjustment slots 28 and fastening holes 58 so that even if a portion of a panel member is used to form a duct section, there are still means to fasten the panel member sections together and to maintain the right angle configuration desired between the side walls, base and cover.

Of importance in the invention is the use of integrally formed panel members, one designated a right-hand panel member and the other a left-hand panel member with each panel member having provision to provide a side wall and a portion of the cover and a portion of the base. The base and cover portions telescope together with adjustment being provided at the base and interlocking being provided at the cover portions. The cable duct is simple in construction, reliable, and may be used to form a duct arrangement of any desired length and of variable width.

Whereas the preferred form of the invention has been shown and described herein, it should be realized that there may be many modifications, substitutions and alterations thereto.

The embodiments of the invention in which an exclusive property or privilege is claimed are defined as follows:

1. A cable duct including a plurality of end-to-end connectable sections, each section being adjustable in width and formed of two interengaging plastic panel members which, in combination, form side walls, cover and base of each section, each panel member includes one of said side walls, a cover portion and a base portion, said side wall being joined to said cover portion and base portion by an integrally hinged connection, each panel member, when folded at its hinged connection, forming said side wall, said portion of the cover and said portion of the base, a plurality of integral latches for holding said base portion in a folded condition relative to said side wall, each latch including a locking member integrally formed into one of said side walls and a corresponding opening formed in the base portion, cooperating fastening means on each cover and on each base, said cooperating fastening means being formed and adapted to provide for securing said base portions together and said cover portions together, with variable spacing between said side walls, the cooperating fastening means for securing said base portions one to another include a transverse slot in the base portion of one of said panel members, a fastener opening in alignment therewith in the base portion of the other of said panel members and a fastening member, the cooperating fastening means for securing said cover portions one to another include a locking member integrally formed into said one cover portion and a corresponding opening formed in said another cover portion.

2. The cable duct of claim 1 characterized in that one of said panel members includes a plurality of longitudinal projections at one end thereof and aligned openings at the opposite end thereof for interengaging said connectable sections to form said cable duct.

3. The cable duct of claim 2 characterized in that there are two projections at said one end of said connectable sections, with said projections being unequal in size to prevent misalignment of said connectable sections.

4. The cable duct of claim 2 characterized in that said aligned openings are formed by longitudinally extending slots in the bottom of the base portion of said one of said panel members.

5. The cable duct of claim 1 characterized in that said interengaging panel members are severable to form members of less than full length, said several panel members being joinable with unsevered panel members to form a cable duct.

* * * * *